Jan. 30, 1934.  W. S. WILSON  1,945,172
UTILIZATION OF SLUDGE ACID
Filed March 12, 1930
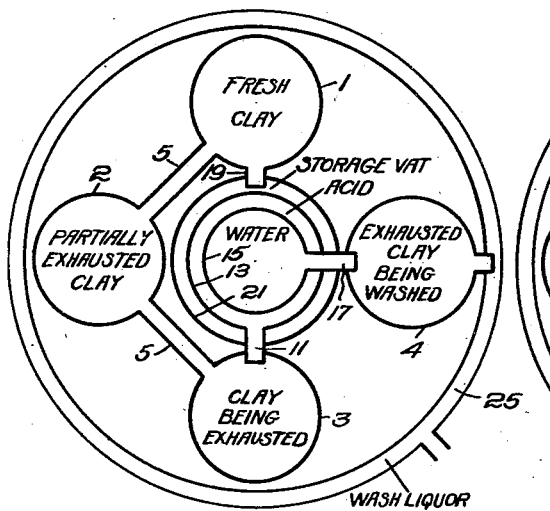
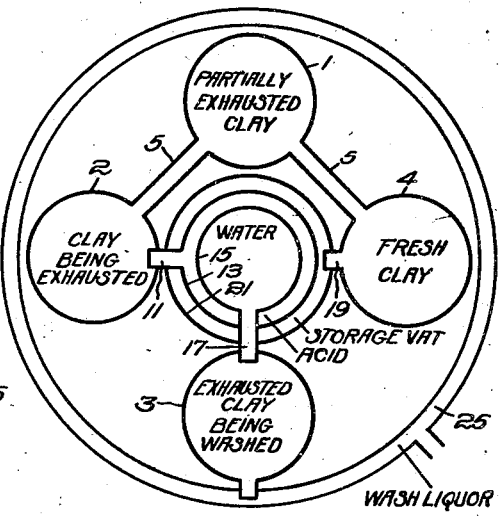
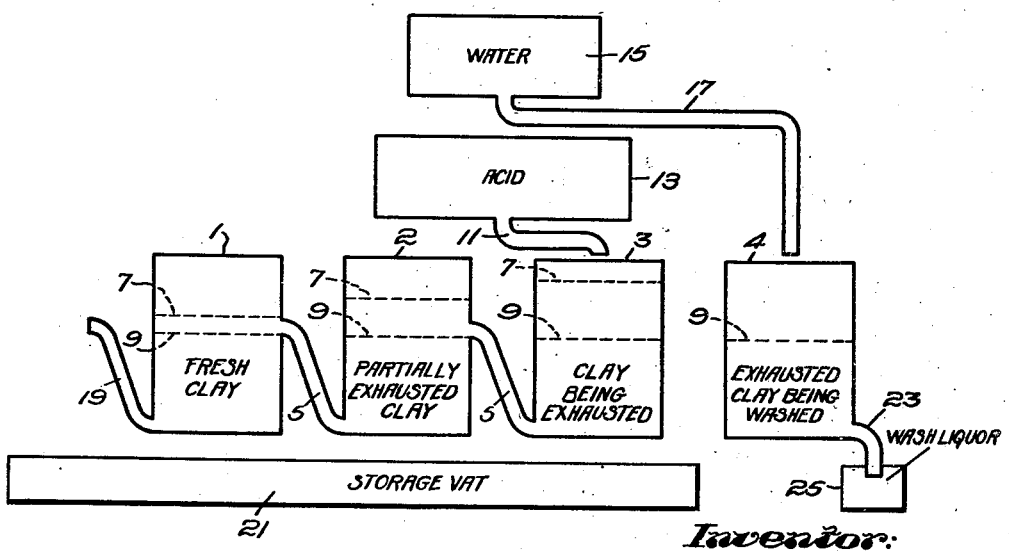
Inventor:
William S. Wilson Patented Jan. 30, 1934

1,945,172

UNITED STATES PATENT OFFICE 1,945,172

UTILIZATION OF SLUDGE ACID

William S. Wilson, Boston, Mass., assignor to Merrimac Chemical Company, Inc., Boston, Mass., a corporation of Massachusetts Application March 12, 1930. Serial No. 435,204

8 Claims. (Cl. 23—123)

My invention relates to the commercial utilization of sludge acid, particularly but not exclusively for producing alum and silicious material from clay.

My co-pending applications Serial No. 417,237, filed December 28, 1929, and Serial No. 430,-456, filed February 21, 1930, describe a process which from one aspect contemplates forming clay into small bodies either by extruding wet clay or breaking clay minerals, calcining the clay to produce form-retaining masses containing acid soluble alumina, which afterward is leached from the clay by treating the latter with sulphuric acid to produce alum (aluminum sulphate) or with nitric, hydrochloric, formic, or acetic acid to produce corresponding aluminum salts, leaving in each instance a residue of form-retaining masses consisting essentially of porous silica, which latter is useful as a surrogate for fullers and infusorial earths.

It has been found that the above process may be performed with use of acid contaminated with organic matter, as for example so-called "sludge acid", and, from certain aspects, with improved results.

Sludge acid is a waste product of the oil refining industries. Commercially, petroleum distillates, as for example gasoline, are commonly purified by treating them with acid, commonly sulphuric acid, the process briefly consisting in placing the gasoline, or the like, in tanks to which is added concentrated acid, say commercial sulphuric acid of about 60 to 65% concentration. This acid descends through the gasoline, and takes into solution various residual heavy hydrocarbon oils and other organic impurities. The acid, after settling at the bottom of the tank, is drawn off with its dissolved organic matter. This substance is known as "sludge acid". Its constituents will vary, but commonly it will consist of about 55% sulphuric acid, 5% water, and 40% organic matter.

Sludge acid is characterized by a strongly fetid and nauseating odor, and heretofore the problem of its disposal has been a matter of serious concern to the oil refining industries. Although it is possible, by a process involving dilution of the sludge acid, to separate part of the dissolved oil, this process increases the bulk of the residual liquor which must be disposed of in some way. Where possible it has been commonly disposed of by carrying it to sea and dumping it, and in some cases where this has not been possible it has been concentrated after removing the oils. However, concentrating the acid, in many cases is impossible, due to the oxidizing action of the acid on the organic matter when the diluted solution is heated to drive off the water, resulting in some plants in production of an almost solid product if it is attempted to concentrate the acid to a degree which will render it suitable for reuse. In the most favorable cases known to applicant, the concentrated acid will be a more or less sticky black liquor filled with carbon particles, and will contain more or less dissolved organic matter rendering it more or less unsatisfactory for reuse. Further, the cost of concentrating the diluted acid is, in most cases, more than the market cost of commercial acid, and ordinarily when used it is because there is no feasible way of otherwise disposing of it.

It has been found that calcined bodies of ordinary clays may be satisfactorily leached with sulphuric acid concentrations of about 30 to 35%, higher concentrations causing for ordinary clays decrepitation of the calcined clay bodies, and lower concentrations requiring bulky apparatus due to the consequent slow rate of solution of the alumina in the sulphuric acid. Conveniently, therefore, the sludge acid may be diluted to reduce the acid concentration to about 30 to 35%, this dilution causing precipitation of a large proportion of the dissolved hydrocarbons which may be separated therefrom and utilized as fuel oil in performing other steps in the process hereinafter described. Conveniently, this separation may be effected by placing the sludge acid in tanks and adding water. The oils separated out will float on the surface of the liquor, and the dilute acid containing the remaining dissolved organic matter may then be drawn off from the bottom of the tank and used in the leaching process.

When the calcined clay bodies are treated with the separated sludge acid to cause the sulphuric or other acid therein to dissolve alumina from said bodies, it is found that the individual bodies will have somewhat uniformly distributed throughout their masses organic matter from the acid with a decidedly heavier coacting on the exterior of the bodies. This is believed to be due to the result of adsorption and the "salting out" effect on the solution due to the combining of the sulphuric acid with the alumina to produce aluminum sulphate. Sufficient organic matter may be removed in this way to cause the alum liquor obtained to be but slightly discolored, due to the presence of a small residue of organic matter. Such liquor may, to a slight extent, have the characteristic odor of sludge acid, but not to such an extent as to render it unsatisfactory for many uses, as for example, water filtration and clarification.

As compared to the alum liquor produced when commercial sulphuric acid is employed, it is found that the liquor produced according to the present process has a much larger percentage of any iron present in the form of ferrous salts as distinguished from ferric salts, the latter being objectionable for many uses of alum, and, when present in any appreciable amount, requiring subsequent treatment of the liquor, as for example, treatment with aluminum dross or sodium sulphide for reducing the ferric salts to ferrous salts prior to using the alum. Consequently, as compared to the use of commercial sulphuric acid, the present invention reduces the cost of treating the liquor for reducing to a ferrous state any iron which may be present, or entirely eliminates the necessity of this treatment, depending upon the amount of iron present.

The residual clay bodies after treatment with the separated sludge acid may be washed, and then treated to remove the organic matter, which conveniently may be done by heating them to a dull red heat in a furnace having an oxidizing flame. For example, the masses of wet clay bodies may be placed in any suitable furnace having an oil or coal gas flame, and the bodies heated to about 700° C. and maintained at that temperature for a few minutes, the exact time depending upon the oxidizing characteristics of the flame to which the bodies are subjected.

As compared to treating the bodies with commercial sulphuric acid, it has been found that according to the present process, the residual bodies for ordinary clays are of improved color, being whiter, which is believed to be due to a bleaching effect produced when the organic matter distributed through the bodies, and with which the bodies are coated, is burned off.

From the above it will be observed that the present process commercially utilizes the heretofore substantially economically useless sludge acid, with production of an improved silicious material, and from some aspects an improved alum liquor.

The improved process may, with the modifications above mentioned, be practised in accordance with the applications herein above mentioned. Briefly, however, as an example of this practice, but without limitation thereto, wet clay may be extruded through dies to produce short cylinders, say about $\frac{3}{32}$ of an inch in diameter, the extruded clay it having been found breaking, due to handling and drying, into slightly curved lengths of from about $\frac{1}{4}$ to $\frac{5}{8}$ of an inch long. For this purpose the well known type of auger extrusion machine may be employed, and preferably, the clay before extrusion is treated with water to bring its water content into the vicinity of the optimum water of plasticity, which content for average clays will be about 35% in respect to dry clay.

The clay after extrusion may be dried without decrepitation by heating it in an oven for about three hours at 100° C., or in less time by blowing hot air over it. The safe temperature and time for drying the clay will vary with the nature of the clay, the size of the forms, and the amount of moisture it contains. Apparently the temperature must be decreased with the moisture content and the distance from the center to the surface of the form. With many clays the temperature may be materially increased above that given above, as for example, with forms of the shape and size above given, Bennington, Vermont clay in the nature of kaolinite and containing 36% moisture has been dried without decrepitation by heating it for four minutes at 520° C.

The times and temperatures for calcining the clay bodies, in respect to obtaining best results, may vary with different clays, but for average clays, for example, the Bennington, Vermont clay mentioned above, satisfactory results will be obtained by heating the extruded bodies in a furnace for one hour at about 650° C., or to a higher temperature, say about 850° C., for twenty minutes. Other temperatures, say temperatures intermediate these, may be employed with correspondingly longer times for lower temperatures and shorter times for higher temperatures.

Thus treating the clay apparently breaks it down into silica ($SiO_2$) and acid soluble alumina, the calcined bodies being quite stable in respect to handling without breakage, and being capable of being leached without decrepitation to remove the alumina by use of many mineral and organic acids, among which is sulphuric acid and the other acids above referred to. This leaching is materially facilitated, due to the fact that the calcined bodies produced are quite porous, the latter, it is believed, caused by the escape of the combined water in the form of steam from the interior of the bodies during calcining.

The above mentioned property of the bodies of being capable of being leached without decrepitation is believed to be due to incipient fusion, the latter probably caused by the production of silicious material such as an alumina silicate insoluble in common acids, or if the clay contains magnesium or sodium salts, or other salts or oxides of earthy metals, by the production of magnesium or sodium aluminum silicate, or the like, these silicates acting as a bond to unite the silica particles.

The composition of the calcined material will vary with the clay, the Vermont clay referred to above having, for example, after calcination, about 55.3% silica, 36% sulphuric acid soluble alumina, and 3.3% alumina insoluble in sulphuric acid, the latter it is believed in the form of an aluminum silicate compound or compounds serving as the bond between the silica particles.

It will be understood that the invention is not limited to any particular size and shape of clay bodies. It has been observed, however, that when the calcined clay is treated with sulphuric acid, the rate of solution of the alumina is approximately proportional to the surface exposed to the acid and to the acid concentration, and approximately inversely proportional to the thickness of the particles, the amount of alumina already dissolved, and the amount of aluminum sulphate in the extracting solution. Spherical, spheroidal, ribbon, tubular, fluted, and small flat foraminous shapes, and the like, may be employed, but for practical purposes these are more expensive to produce and more difficult satisfactorily to handle than cylindrical shapes. In general it is desirable to have the diameter of the cylindrical shapes small enough to produce a speedy reaction with solution of all the free alumina therein, while having the diameter large enough to permit handling of the material without breakage. It will also be understood that the length of the shapes may be increased with their cross-sectional area without undue likelihood of the forms breaking during handling.

It will be understood that the invention is not limited to the use of any particular clays, as any primary or secondary clays, clay earths, or clay minerals, for example, those mentioned in the above referred to co-pending applications, which when molded or in their natural state are susceptible of calcining without decrepitation to produce a mass capable of being leached with the desired rapidity of alumina extraction without decrepitation, are suitable for use in the process. Further, as mentioned in said co-pending applications, certain clay minerals, as for example indianaite, may be broken into sizes, say about the size of pea coal, and calcined and used in the process, thus avoiding the necessity of molding the clay into shapes.

Figs. 1, 2 and 3 schematically show one example of apparatus for leaching the calcined clay bodies according to the present invention. Referring to Fig. 1, four lead-lined tanks, or tanks or other material inert with respect to sulphuric acid or other acid being used, respectively numbered 1 to 4, each capable of holding say one ton of the calcined material, are provided, three of these tanks being connected in series by pipes 5 so that the discharge from the bottom of one tank will enter the next tank above the clay in the latter, the liquid levels in the three tanks being such as to allow for increasing heads from one end of the series to the other to compensate for the increasing specific gravity of the liquor as it becomes charged with aluminum sulphate. The heads of the liquor in the several tanks are schematically indicated at 7 in Fig. 3, which figure is a schematic development of the arrangement of tanks shown in Fig. 1, while the level of the calcined material in said tanks is schematically indicated by the lines 9.

As shown, a pipe 11 is provided leading from an elevated acid tank 13, while above said tank is placed a water tank 15 having a discharge pipe 17. The acid and water tanks may be rotated so that the pipes 11 and 17 may discharge into any of the tanks 1 to 4. The tanks 1 to 4 are further provided with pipes 19, provided with valves (not shown), so that the contents of the tanks may discharge into a storage vat 21 for receiving the aluminum sulphate liquor. Each tank is further provided with a pipe 23 having a valve (not shown) so that the contents of the tanks may discharge into a collector 25 for the wash liquor delivered to the tanks from the water tank 15. Conveniently each of the tanks 1 to 4 may be mounted on trunnions so that it can be dumped to discharge its contents into a suitable conveyor, and to permit this to be accomplished suitable unions, or the like, may be provided for "breaking" the pipes preparatory to dumping.

It will be understood that the above described arrangement of apparatus is only schematic, and it is believed unnecessary to illustrate in respect to the present invention the details of piping, valves, and the like, employed. For convenience only those pipes are shown in Figs. 1, 2 and 3 which are in use under the respective conditions illustrated in those figures.

In the practice of the invention with the above described example of apparatus, the tank 1 may be charged with fresh calcined clay bodies, and said tank may be connected to discharge into the storage vat 21, while the water tank 15 and acid tank 13 may be rotated into positions to cause them respectively to discharge into the tank 4 and tank 3. Under these conditions, in the example of the process about to be described, the tank 4 will contain clay from which substantially all the alumina has been extracted, while the tanks 2 and 3 will contain clay respectively having a decreasing alumina content as compared to that of the clay in the tank 1. The liquor entering the tank 1 has a low acid content and a high aluminum sulphate content, and said liquor flowing through said tank and acting upon the surface of the fresh clay in said tank will extract the last fractions of the acid, it being understood, however, that a basic or acid liquor may be produced, as desired. Under ordinary circumstances, economically the liquor discharged from the tank 1 may be approximately a 12% basic alumina solution.

It will be observed that the rate of reaction is approximately inversely proportional to the aluminum sulphate content of the liquor, while it is approximately directly proportional to the amount of alumina in the clay bodies and the proximity of the alumina to the surface of said bodies. Consequently, the acid from the tank 13, progressively flowing through the tanks 3, 2 and 1 of Figs. 1 and 3, when it is of maximum acid concentration, acts upon the most exhausted clay, and when it is of maximum aluminum sulphate concentration and minimum acid concentration, acts upon the least exhausted clay, with the result that a rapid reaction and exhaustion of the clay and acid to the desired extent may be effected.

After such time has elapsed from the placing of the fresh clay in the tank 1 that the liquor discharged from said tank is about to become no longer basic, or has the other desired characteristics, the tank 4 will be dumped into a suitable receptacle for receiving the exhausted clay, after which it will be filled with fresh clay. The water and acid tanks at this time may be rotated to discharge water into the tank 3 and acid into the tank 2, while the tank 4 may be connected to the storage vat, and the tank 3 to the wash liquor receptacle 25, the connections then being as shown in Fig. 2. Under these conditions the liquor passing from the tank 4 may be rendered basic by the fresh clay in that tank, while the clay in the tank 3 is washed with acid free water. The operation is then continued, as above described, by at intervals successively dumping exhausted clay from the tanks 3 to 1, successively placing fresh clay in those tanks, and rotating the water and acid tanks successively in a clockwise direction to discharge water into the next successive tank in a clockwise direction from the tank which contains the fresh clay and to discharge acid into the next successive tank following the tank into which the water is being discharged.

Conveniently prior to washing the exhausted clay, the acid in the tank which contains such clay is pumped through a bottom outlet of the tank to the adjacent tank containing partially exhausted clay, as for example, prior to admitting water to the tank 3 (Fig. 2) the acid therein may be pumped from the bottom of the tank into the tank 2. The exhausted clay after draining off the acid from the tank 3 will contain considerable acid at maximum concentration, but this acid will be effectively removed by the wash water. The wash liquor may be added to the sludge acid for separating the latter, which will conserve the acid washed from the exhausted clay.

It will be understood that the invention is not limited to the use of the apparatus above described, and that instead of a continuous process an intermittent process may be secured by pumping the acid and water through tanks containing the clay, as described in my co-pending application Serial No. 417,237 herein above referred to. It will also be understood that the number of tanks employed in the apparatus schematically illustrated by Figs. 1 to 3 may be increased or diminished so as to treat the clay with acid in a greater or less number of tanks than three, or to wash the exhausted clay by passing the water through a number of tanks in series. The term "bodies" as used in the claims is to be understood as comprehending shapes no matter how formed from a mass of relatively smaller clay particles rendered plastic by the presence of water and whether uniform or not in respect to volume and geometric proportions.

As acids containing organic matter result in the production of an improved silicious residue of the clay in the practice of the improved process, commercial acid may be purposely contaminated with organic matter, such as crude petroleum oils, and used in the process, if the production of the silicious residue is the main or only consideration.

I claim:

1. The process of economically utilizing so-called sludge acid which comprises diluting said acid with water to precipitate a fraction of the dissolved organic matter constituting a fuel oil; and allowing the residual diluted liquor to act upon calcined clay to form an alum liquor and to cause the residual clay to collect organic matter from the liquor.

2. The process of economically utilizing so-called sludge acid which comprises passing it through a mass of relatively small form-retaining porous bodies of calcined clay to dissolve alumina from said bodies and to cause said bodies to collect organic matter from the liquor.

3. The process of economically utilizing so-called sludge acid which comprises passing it through a mass of relatively small form-retaining porous bodies of calcined clay to dissolve alumina from said bodies and to cause said bodies to collect organic matter from the liquor, and burning the collected organic matter from said bodies whereby a pure silica residue is obtained.

4. The process of economically utilizing so-called sludge acid which comprises diluting said acid with water, passing the diluted acid containing dissolved organic matter through a mass of relatively small form-retaining porous bodies of calcined clay to dissolve alumina from said bodies and to cause said bodies to collect organic matter from the liquor.

5. The process of economically utilizing so-called sludge acid which comprises diluting said acid with water, passing the diluted acid content containing dissolved organic matter through a mass of relatively small form-retaining porous bodies of calcined clay to dissolve alumina from said bodies and to cause said bodies to collect organic matter from the liquor, and burning the collected organic matter from said bodies.

6. The process of economically utilizing so-called sludge acid which comprises passing the dilute acid contents thereof contaminated with organic matter through a mass of relatively small form-retaining bodies of calcined clay to cause at least the major portion of said acid to combine with at least the major portion of the alumina of said clay and the major portion of the organic matter to be collected by the residual clay, collecting the liquor, washing the clay bodies with water to remove the residual acid, and adding the wash liquor to raw sludge acid to dilute the acid contents thereof and separate therefrom a portion of the organic matter.

7. The process of economically utilizing so-called sludge acid which comprises passing the dilute acid contents thereof contaminated with organic matter through a mass of relatively small form-retaining bodies of calcined clay to cause at least the major portion of said acid to combine with at least the major portion of the alumina of said clay and the major portion of the organic matter to be collected by the residual clay, collecting the liquor, washing the clay bodies with water to remove the residual acid, adding the wash liquor to raw sludge acid to dilute the acid contents thereof and separate therefrom a portion of the organic matter, and burning the collected organic matter from the washed bodies.

8. The process of economically utilizing so-called sludge acid which comprises passing the dilute acid contents thereof contaminated with organic matter through a mass of relatively small form-retaining bodies of calcined clay to cause substantially all the acid soluble alumina of said bodies to be dissolved and said bodies to collect organic matter from the liquor, regulating the amount of acid acting upon said bodies to produce substantially basic alum, washing said bodies, and adding the wash liquor to raw sludge acid to dilute the acid contents thereof and separate therefrom a portion of the organic matter.

WILLIAM S. WILSON.